US012678946B2

(12) United States Patent
Kim et al.

(10) Patent No.: US 12,678,946 B2
(45) Date of Patent: Jul. 14, 2026

(54) ROBOT DRIVE SYSTEM AND ROBOT DRIVE METHOD BASED ON HIGH-DIMENSIONAL VECTOR COMPUTING

(71) Applicants: COGA ROBOTICS Co., Ltd., Seoul (KR); Daegu Gyeongbuk Institute of Science & Technology, Daegu (KR)

(72) Inventors: Yong Nyeon Kim, Seoul (KR); Il Hong Suh, Seoul (KR); Yeseong Kim, Daegu (KR); Jin Hyung Kim, Seoul (KR); Tae Hyeong Kim, Seoul (KR); Hyukjun Kwon, Daegu (KR)

(73) Assignees: COGA ROBOTICS Co., Ltd., Seoul (KR); Daegu Gyeongbuk Institute of Science & Technology, Daegu (KR)

( * ) Notice: Subject to any disclaimer, the term of this patent is extended or adjusted under 35 U.S.C. 154(b) by 49 days.

(21) Appl. No.: 19/001,381

(22) Filed: Dec. 24, 2024

(65) Prior Publication Data

US 2025/0214233 A1    Jul. 3, 2025

(30) Foreign Application Priority Data

Dec. 28, 2023    (KR) ........................ 10-2023-0193934

(51) Int. Cl.
*B25J 9/16*        (2006.01)
*B25J 13/08*       (2006.01)
*G06N 3/092*       (2023.01)

(52) U.S. Cl.
CPC ............... *B25J 9/163* (2013.01); *B25J 13/08* (2013.01); *G06N 3/092* (2023.01)

(58) Field of Classification Search
CPC ... B25J 9/163; B25J 9/1697; B25J 9/16; B25J 9/1602; B25J 9/1628; B25J 13/08;
(Continued)

(56) References Cited

U.S. PATENT DOCUMENTS

| | | | |
|---|---|---|---|
| 2021/0205986 A1* | 7/2021 | Kalouche | ................. B25J 9/163 |
| 2024/0054403 A1* | 2/2024 | Zeulin | .................... G06N 20/00 |
| 2024/0219895 A1* | 7/2024 | Sekiguchi | ............ G06N 3/0455 |

FOREIGN PATENT DOCUMENTS

| | | | |
|---|---|---|---|
| JP | 2021061014 A | * | 4/2021 |
| JP | 2022-175570 A | | 11/2022 |

OTHER PUBLICATIONS

Office Action of Korean Patent Application No. 10-2023-0193934 mailed Aug. 17, 2025.

* cited by examiner

*Primary Examiner* — Ramon A. Mercado
*Assistant Examiner* — Noah W Stiebritz
(74) *Attorney, Agent, or Firm* — Revolution IP, PLLC

(57) ABSTRACT

A robot drive system includes: an encoder for encoding a plurality of pieces of time-series sensor data measured from a plurality of sensors provided in a robot to generate a plurality of high-dimensional input vectors; an imitation learning unit for training a high-dimensional computing (HDC) object model to generate a high-dimensional vector matched with each of a plurality of robot actions and sensor information using a learning data set including a plurality of pieces of sensor information of the plurality of sensors labeled with a control action signal indicated by a robot drive signal received from a user in response to each point in time; and a similarity analyzer for analyzing a similarity between a plurality of high-dimensional object vectors generated from the HDC object model and the plurality of high-dimensional input vectors when training of the HDC object model is completed.

13 Claims, 5 Drawing Sheets

(58) Field of Classification Search
CPC .......... G06N 20/00; G06N 3/08; G06N 3/092;
G06N 3/0455; G05B 13/0265
See application file for complete search history.

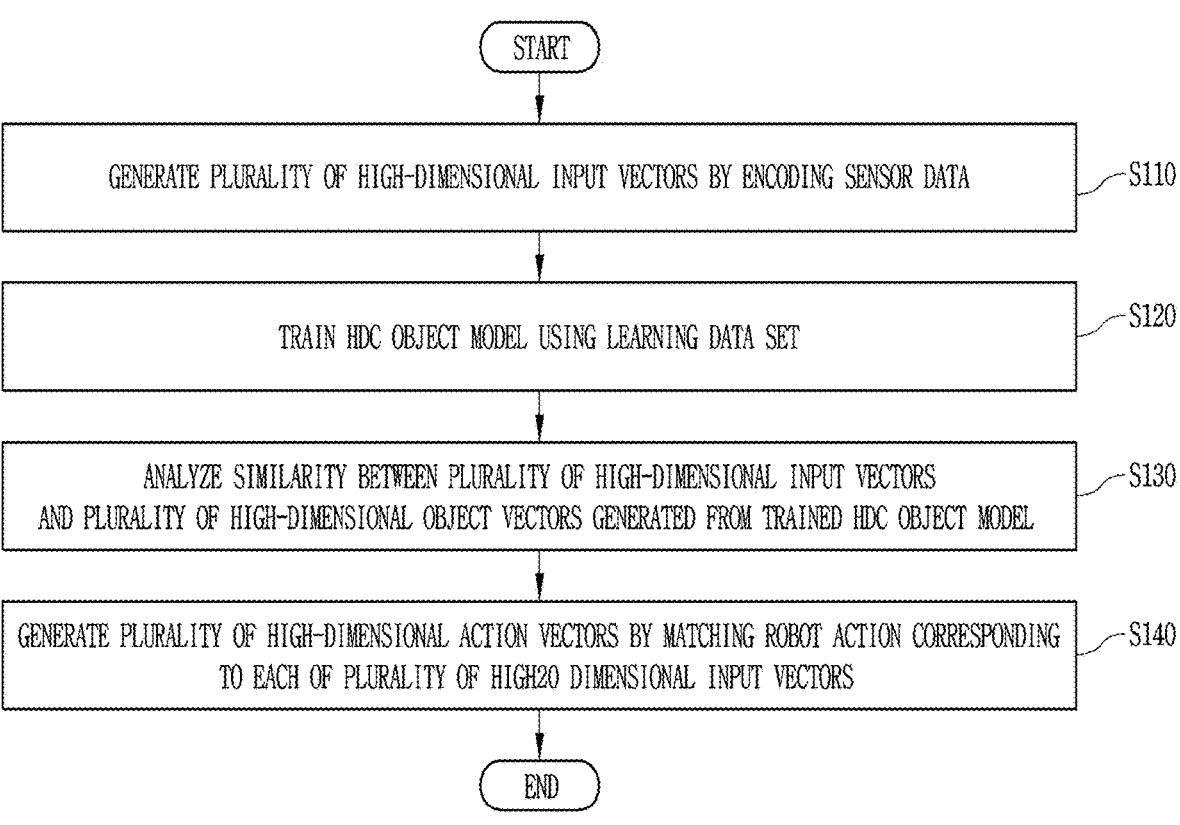

START

GENERATE PLURALITY OF HIGH-DIMENSIONAL INPUT VECTORS BY ENCODING SENSOR DATA — S110

TRAIN HDC OBJECT MODEL USING LEARNING DATA SET — S120

ANALYZE SIMILARITY BETWEEN PLURALITY OF HIGH-DIMENSIONAL INPUT VECTORS AND PLURALITY OF HIGH-DIMENSIONAL OBJECT VECTORS GENERATED FROM TRAINED HDC OBJECT MODEL — S130

GENERATE PLURALITY OF HIGH-DIMENSIONAL ACTION VECTORS BY MATCHING ROBOT ACTION CORRESPONDING TO EACH OF PLURALITY OF HIGH20 DIMENSIONAL INPUT VECTORS — S140

END

FIG. 5

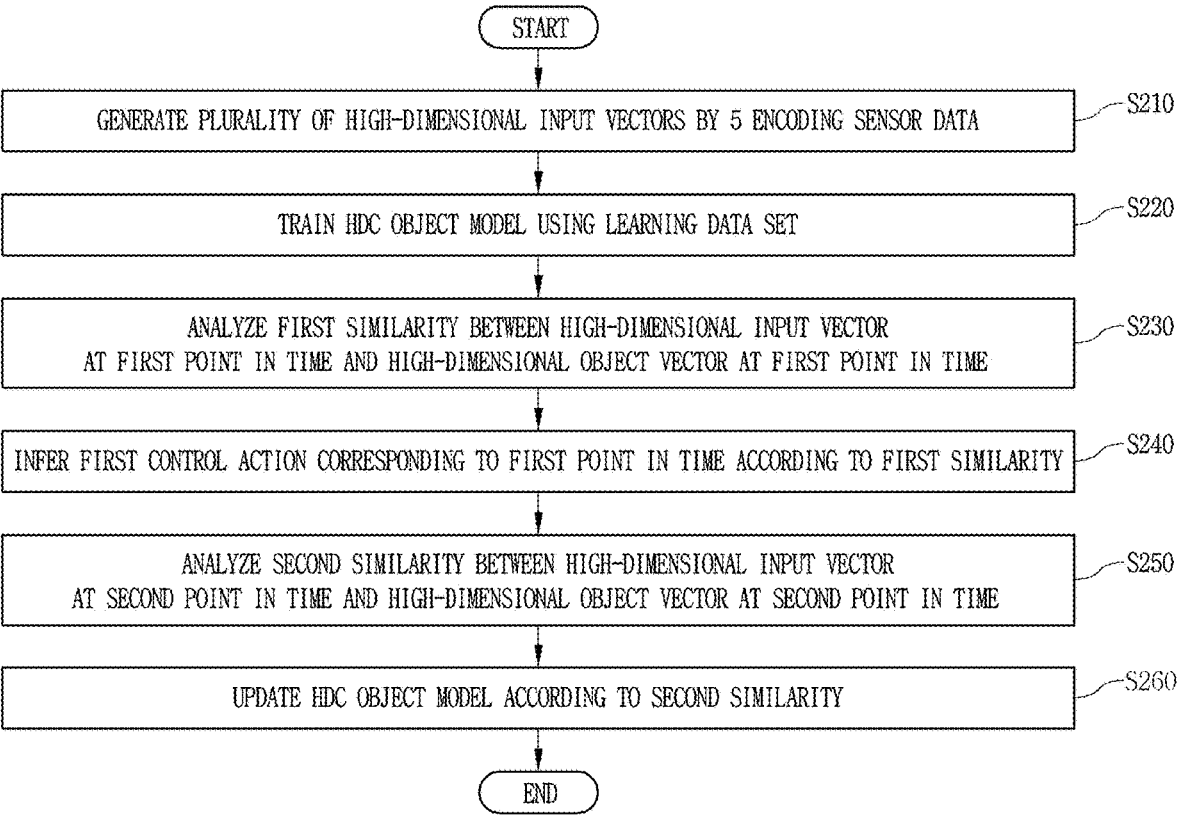

START

GENERATE PLURALITY OF HIGH-DIMENSIONAL INPUT VECTORS BY 5 ENCODING SENSOR DATA — S210

TRAIN HDC OBJECT MODEL USING LEARNING DATA SET — S220

ANALYZE FIRST SIMILARITY BETWEEN HIGH-DIMENSIONAL INPUT VECTOR AT FIRST POINT IN TIME AND HIGH-DIMENSIONAL OBJECT VECTOR AT FIRST POINT IN TIME — S230

INFER FIRST CONTROL ACTION CORRESPONDING TO FIRST POINT IN TIME ACCORDING TO FIRST SIMILARITY — S240

ANALYZE SECOND SIMILARITY BETWEEN HIGH-DIMENSIONAL INPUT VECTOR AT SECOND POINT IN TIME AND HIGH-DIMENSIONAL OBJECT VECTOR AT SECOND POINT IN TIME — S250

UPDATE HDC OBJECT MODEL ACCORDING TO SECOND SIMILARITY — S260

END

ROBOT DRIVE SYSTEM AND ROBOT DRIVE METHOD BASED ON HIGH-DIMENSIONAL VECTOR COMPUTING

CROSS-REFERENCE TO RELATED APPLICATION

This application claims the benefit of and priority to Korean Patent Application No. 10-2023-0193934, filed on Dec. 28, 2023, the entire disclosure(s) of which is hereby incorporated herein by reference in its entirety.

BACKGROUND

The present disclosure relates to a robot drive system and a robot drive method, and specifically, to a system and a method for performing lightweight imitation learning and reinforcement learning based on high-dimensional vector computing and generating a robot control signal by a straightforward vector operation based thereon.

With the spread of an unmanned system using a robot across all industries, machine-learning technology is being utilized to reinforce the autonomy of a robot system. However, in the current state of machine learning with inefficient energy consumption and performance of the latest GPU, there is a need to mend the inconsistency between limitation by energy and a calculation request of the machine learning.

High-dimensional computing (HDC) is emerging as a brain-inspired computing method to address various concerns about efficiency and lightweight learning. Unlike numerical calculation methodology which greatly depends on an arithmetic operation based on conventional Boolean logic, HDC is enabled to perform machine learning by utilizing various pieces of information encoded at high-dimensional vectors, thereby enabling effective operation.

SUMMARY

The present disclosure has been devised to obviate the above limitation of the related art. An aspect of the present disclosure is directed to providing a robot drive system and a robot drive method capable of generating a signal which drives a robot using a high-dimensional vector through an HDC method.

The aspects of the present disclosure are not limited to those mentioned above, and other aspects not mentioned herein will be clearly understood by those skilled in the art from the following description.

The robot drive system includes: an encoder for encoding a plurality of pieces of time-series sensor data measured from a plurality of sensors provided in a robot to generate a plurality of high-dimensional input vectors; an imitation learning unit for training a high-dimensional computing (HDC) object model to generate a high-dimensional vector matched with each of a plurality of robot actions and sensor information using a learning data set including a plurality of pieces of sensor information of the plurality of sensors labeled with a control action signal indicated by a robot drive signal received from a user in response to each point in time; and a similarity analyzer for analyzing a similarity between a plurality of high-dimensional object vectors generated from the HDC object model and the plurality of high-dimensional input vectors when training of the HDC object model is completed, wherein the HDC object model matches a robot action corresponding to each of the plurality of high-dimensional input vectors among the plurality of robot actions based on a result of analyzing the similarity and generates a plurality of high-dimensional action vectors.

The learning data set may include hard negative samples corresponding to a label specified as hard negative among control action signals labeled to each of the plurality of pieces of sensor information and the plurality of pieces of sensor information, and positive samples corresponding to a label specified as positive.

The imitation learning unit may determine a weighting indicating samples to be utilized in training among the hard negative samples based on a hyper parameter for each of a plurality of learning iterations, train the HDC object model based on the entire positive samples and at least one first sample among the hard negative samples in first learning iteration among the plurality of learning iterations, and train the HDC object model based on the entire positive samples and at least one second sample that is different from the at least one first sample among the hard negative samples in second learning iteration next to the first learning iteration among the plurality of learning iterations.

The similarity analyzer may determine a similarity corresponding to each of the plurality of high-dimensional input vectors by performing a matrix multiplication of each of the plurality of high-dimensional input vectors with a vector corresponding to the plurality of high-dimensional object vectors, wherein a result of analyzing the similarity may include the similarity corresponding to each of the plurality of high-dimensional input vectors.

Each of the plurality of pieces of time-series sensor data may include sensor information corresponding to each of a plurality of points in time, and the encoder may generate the plurality of high-dimensional input vectors indicating the sensor information corresponding to each of the plurality of points in time from the plurality of pieces of time-series sensor data.

The similarity analyzer may analyze a first similarity between a first high-dimensional input vector corresponding to a first point in time among the plurality of high-dimensional input vectors and a first high-dimensional object vector corresponding to the first point in time among the plurality of high-dimensional object vectors; the HDC object model may infer a first control action corresponding to the first point in time based on a result of analyzing the first similarity; and the plurality of points in time may include the first point in time.

There may be further included: a target HDC model for analyzing a second similarity between a second high-dimensional input vector corresponding to a second point in time among the plurality of high-dimensional input vectors and a second high-dimensional object vector corresponding to the second point in time among the plurality of high-dimensional object vectors based on a result of executing the first control action; and a reinforcement learning unit for updating the HDC object model based on the second similarity, wherein the second point in time may be a point in time immediately after the first point in time among the plurality of points in time.

According to another embodiment of the present disclosure, the robot drive method includes: encoding a plurality of pieces of time-series sensor data measured from a plurality of sensors provided in a robot to generate a plurality of high-dimensional input vectors; training a high-dimensional computing (HDC) object model to generate a high-dimensional vector matched with each of a plurality of robot actions and sensor information using a learning data set including a plurality of pieces of sensor information of the plurality of sensors labeled with a control action signal indicated by a robot drive signal received from a user in response to each point in time; analyzing a similarity between a plurality of high-dimensional object vectors generated from the HDC object model and the plurality of high-dimensional input vectors when training of the HDC object model is completed; and generating a plurality of high-dimensional action vectors by matching a robot action corresponding to each of the plurality of high-dimensional input vectors among the plurality of robot actions based on a result of analyzing the similarity.

The learning data set may include hard negative samples corresponding to a label specified as hard negative among control action signals labeled to each of the plurality of pieces of sensor information and the plurality of pieces of sensor information, and positive samples corresponding to a label specified as positive. There may be further included: determining a weighting indicating samples to be utilized in training among the hard negative samples based on a hyper parameter for each of a plurality of learning iterations; training the HDC object model based on the entire positive samples and at least one first sample among the hard negative samples in first learning iteration among the plurality of learning iterations; and training the HDC object model based on the entire positive samples and at least one second sample that is different from the at least one first sample among the hard negative samples in second learning iteration next to the first learning iteration among the plurality of learning iterations.

There may be further included: determining a similarity corresponding to each of the plurality of high-dimensional input vectors by performing a matrix multiplication of each of the plurality of high-dimensional input vectors with a vector corresponding to the plurality of high-dimensional object vectors, wherein a result of analyzing the similarity may include a similarity corresponding to each of the plurality of high-dimensional input vectors.

There may be further included generating the plurality of high-dimensional input vectors indicating sensor information corresponding to each of the plurality of points in time from the plurality of pieces of time-series sensor data.

There may be further included: analyzing a first similarity between a first high-dimensional input vector corresponding to a first point in time among the plurality of high-dimensional input vectors and a first high-dimensional object vector corresponding to the first point in time among the plurality of high-dimensional object vectors; and inferring a first control action corresponding to the first point in time based on a result of analyzing the first similarity, wherein the plurality of points in time may include the first point in time.

There may be further included: analyzing a second similarity between a second high-dimensional input vector corresponding to a second point in time among the plurality of high-dimensional input vectors and a second high-dimensional object vector corresponding to the second point in time among the plurality of high-dimensional object vectors based on a result of executing the first control action; and updating the HDC object model based on the second similarity, wherein the second point in time may be a point in time immediately after the first point in time among the plurality of points in time.

An embodiment of the present disclosure enables the performance of a robot control through HDC utilizing a negative mining technique, the display of high accuracy even compared to a conventional super-dimensional computing technique, the display of equivalent or higher accuracy even compared to a deep neural network technique mainly used for controlling a robot, or the improvement of operation efficiency.

An embodiment of the present disclosure uses a high-dimensional vector, thereby improving learning speed and energy efficiency.

An embodiment of the present disclosure is enabled to complete learning stably in a super-dimensional computing environment through a reinforcement learning so that an inference model can perform rapid and stable learning in a controlled situation.

An embodiment of the present disclosure is enabled to be performed while being mounted on a real robot even without an additional adjustment through reinforcement learning, which requires no human supervision, and to make inferences based on a trained model even in actual environment, not in a simulation.

BRIEF DESCRIPTION OF THE DRAWINGS

FIG. 3 is a diagram illustrating a detailed configuration of a memory and a processor illustrated in FIG. 1 according to another embodiment that is different from an embodiment illustrated in FIG. 2.

FIG. 4 is a flowchart illustrating a robot drive method according to an embodiment of the present disclosure.

FIG. 5 is a flowchart illustrating a reinforcement learning action of a robot drive method according to an embodiment of the present disclosure.

DETAILED DESCRIPTION

Figure 1:
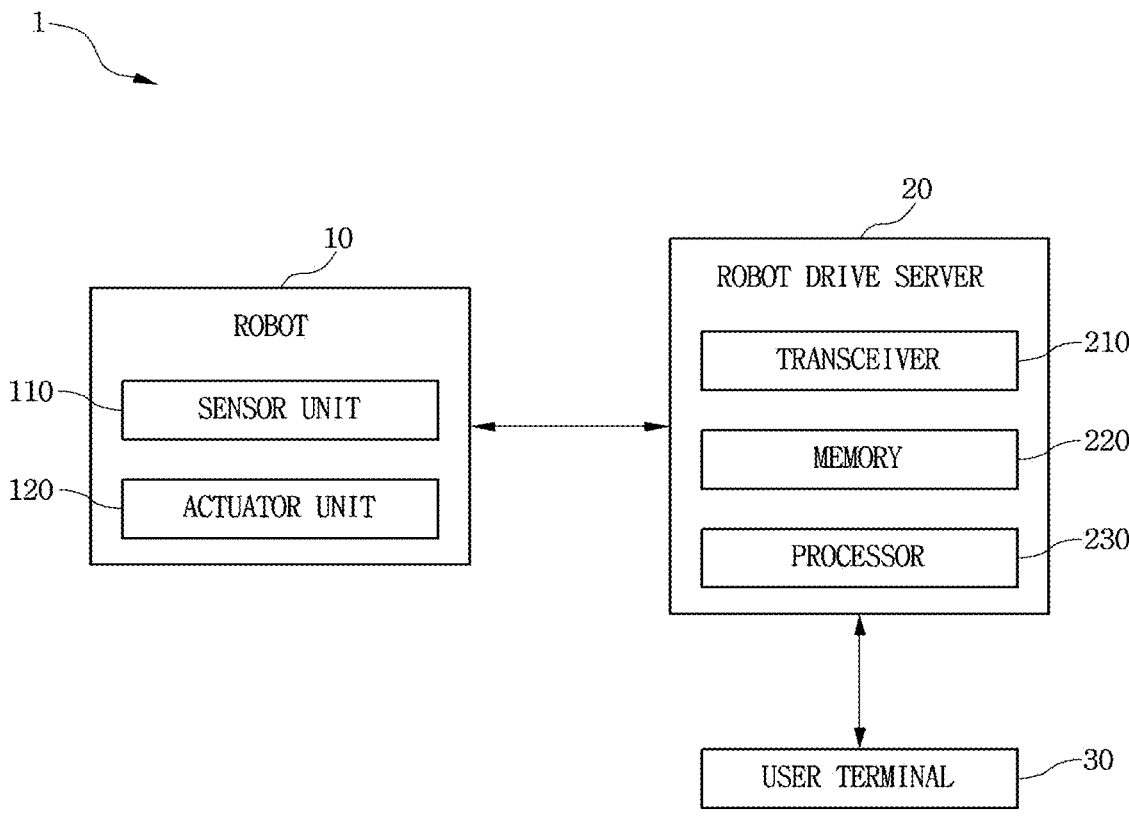
FIG. 1 is a block diagram schematically illustrating a robot drive system according to an embodiment of the present disclosure.

The foregoing purposes, other purposes, features, and advantages of the present disclosure will be readily understood through the following preferred embodiments related to the attached drawings. However, the spirit of the present disclosure is not limited to the exemplary embodiments described herein, but may also be implemented in other forms. Rather, the embodiments introduced herein are provided so as to make the disclosed contents thorough and complete and to fully transfer the spirit of the present disclosure to those skilled in the art.

In the present specification, it will be understood that when an element, component, device, or system is referred to as including a component consisting of a program or software, the element, component, device, or system may include hardware (for example, a memory or a central processing unit (CPU)) necessary to execute or operate the program or software or another program or software (for example, an operating system (OS) or a driver necessary for driving hardware), unless the context clearly indicates otherwise.

In addition, it will be understood that an element (or component) may be implemented by software, hardware, or software and hardware, unless the context clearly indicates otherwise.

In addition, the terms used herein are for the purpose of describing exemplary embodiments only and are not intended to be limiting. As used herein, the singular forms are intended to include the plural forms as well, unless the context clearly indicates otherwise. It will be further understood that the terms "comprises" and/or "comprising," when used in the present specification, do not preclude the presence or addition of one or more other components.

In addition, the terms such as "unit" or "device" as used herein is intended to refer to a functional and structural combination of hardware and software that is driven by the corresponding hardware or for driving the hardware. For example, as used herein, hardware may be a data processing device including a CPU or other processor. In addition, the software that is driven by the hardware may refer to a process in execution, an object, an executable, a thread of execution, and a program.

Hereinafter, the specific technical content to be performed in an embodiment of the present disclosure will be described in detail with reference to the accompanying drawings.

It should be noted that each configuration illustrated in the drawings may be separated functionally and logically, and that those skilled in the technical field to which the present disclosure pertains may easily infer that each configuration is not required to be implemented on separate physical devices or in a separate code.

FIG. 1 is a block diagram schematically illustrating a robot drive system according to an embodiment of the present disclosure.

Referring to FIG. 1, a robot drive system 1 may include a robot 10, a robot drive server 20, and a user terminal 30.

The robot 10 may include a sensor unit 110 and an actuator unit 130. The sensor unit 110 may include a plurality of sensors. Each of the plurality of sensors may be a sensor such as light detection and ranging (LiDAR) to sense the surroundings. The plurality of sensors may generate a plurality of pieces of time-series sensor data including measured sensor information. For example, the sensor information may indicate a distance from the surroundings to a target object. The plurality of pieces of time-series sensor data may include sensor information corresponding to each of a plurality of points in time. For example, a plurality of pieces of sensor data may include a plurality of pieces of sensor information at a t point in time, wherein t is an integer equal to or greater than 1.

The actuator unit 120 may include a plurality of actuators. The plurality of actuators may operate the robot 10 through driving of a motor. For example, the plurality of actuators may include a motor provided in a traveling wheel of the robot 10.

The robot drive server 20 may generate a plurality of robot action signals that control the action of the actuator unit 120 based on the plurality of pieces of time-series sensor data received from the sensor unit 110 and transmit the same to the robot 10. The robot drive server 20 may include a transceiver 210, a memory 220, and a processor 230.

The transceiver 210 may communicate with each of the robot 10 and the user terminal 30 wirelessly via a network to transmit and receive a signal and/or data to and from the robot 10 and/or the user terminal 30. Herein, the network refers to a connection structure capable of exchanging information between nodes such as a plurality of terminals and servers. Examples of the network include a local area network (LAN), a wide area network (WAN), Internet (WWW: World Wide Web), a wired or wireless data communication network, a telecommunication network, a wired or wireless television network, and the like. Examples of the wireless data communication network include 3G, 4G, 5G, 3GPP (3rd Generation Partnership Project), 5GPP (5th Generation Partnership Project), long term evolution (LTE), world interoperability for microwave access (WIMAX), Wi-Fi, Internet, LAN, Wireless LAN, WAN, personal area network (PAN), radio frequency (RF), Bluetooth network, near-field communication (NFC) network, Satellite Broadcasting Network, Analog Broadcasting Network, and digital multimedia broadcasting (DMB) network, but are not limited thereto.

The memory 220 may include a volatile memory and/or a non-volatile memory. The memory 220 may include a storage medium of a flash memory, a hard disk, a solid state disk (SSD), a random access memory (RAM), a static random access memory (SRAM), a read-only memory (ROM), a programmable read-only memory (PROM), an electrically erasable programmable read-only memory (EE-PROM), an erasable programmable read-only memory (EPROM), and/or an embedded multimedia card (eMMC).

The memory 220 may store commands or data related to the components, one or more programs and/or software, an operating system, and the like in order to implement and/or provide actions, functions, and the like provided by the robot drive server 20.

The programs stored in the memory 130 may include a program for training a model for generating the plurality of robot action signals (hereinafter referred to as "robot action model learning program") that control the action of the actuator unit 120 based on the plurality of pieces of time-series sensor data according to an embodiment. Such a robot action model learning program may include instructions needed to encode the plurality of pieces of time-series sensor data, instructions needed to train a model, and instructions needed to infer an action control signal corresponding to the plurality of pieces of time-series sensor data using a trained model. The processor 230 may perform an action to be described later by executing the robot action model learning program stored in the memory 220.

The processor 230 may control the driving of the transceiver 210 and the memory 220, deliver a signal and/or data received by the transceiver 210 from the robot 10 and the user terminal 30 to each configuration of the processor 230, transmit the signal and/or data generated from each configuration of the processor 230 to the configuration corresponding to the robot 10 and the user terminal 30, and store data that needs to be stored in the memory 220. The processor 230 may be implemented by using application-specific integrated circuits (ASICs), digital signal processors (DSPs), digital signal processing devices (DSPDs), programmable logic devices (PLDs), field programmable gate arrays (FPGAs), central processing units (CPUs), graphic processing units (GPUs), micro-controllers, and/or microprocessors.

The user terminal 30 may receive a robot drive signal from a user and transmit the same to the robot drive server 20.

Figure 2:
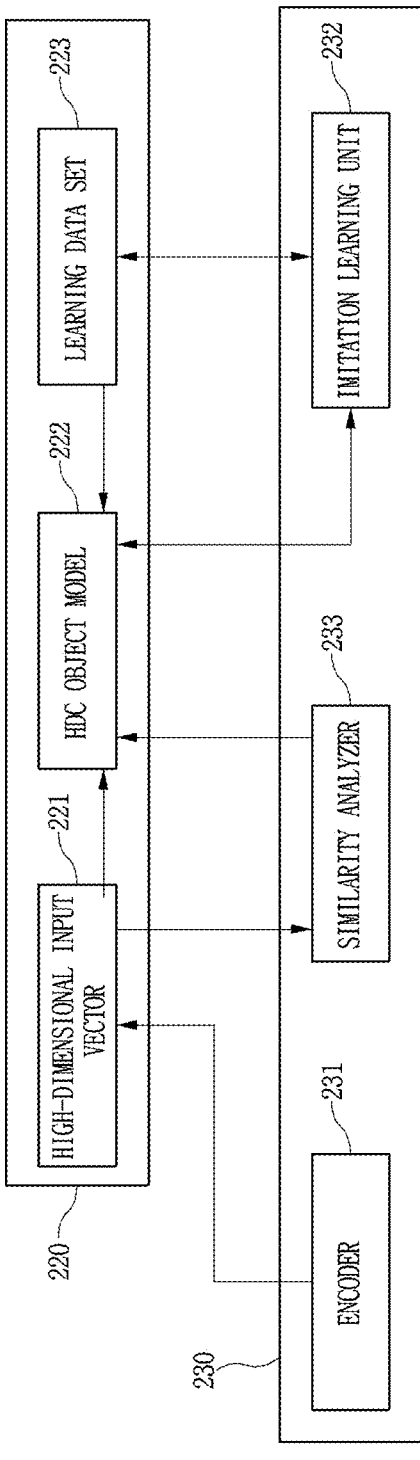
FIG. 2 is a diagram illustrating a detailed configuration of a memory and a processor illustrated in FIG. 1 according to an embodiment.

FIG. 2 is a diagram illustrating a detailed configuration of a memory and a processor illustrated in FIG. 1 according to an embodiment.

Referring to FIG. 2, the memory 220 may include a high-dimensional input vector 221, a high-dimensional computing (HDC) object model 222, and a learning data set 223. In addition, the processor 230 may include an encoder 231, an imitation learning unit 232, and a similarity analyzer 233.

The encoder 231 may generate a plurality of high-dimensional input vectors by encoding a plurality of pieces of time-series sensor data received from the plurality of sensors of the sensor unit 110. Each of the plurality of pieces of time-series sensor data may include sensor information corresponding to each of the plurality of points in time, and the encoder 231 may generate the plurality of high-dimensional input vectors indicating the sensor information corresponding to each of the plurality of points in time from the plurality of pieces of time-series sensor data. For example, the encoder 231 may encode sensor information of a point in time of t=1 as a first high-dimensional input data, sensor information corresponding to each point in time of t=2 to t=n−1 as second to n−1th high-dimensional input data, and sensor information of a point in time of t=n as an nth high-dimensional input data among sensor information included in M pieces of sensor data among the M pieces of sensor data during a period of from a point in time of t=1 to a point in time of t=n, wherein n is an integer equal to or greater than 2, and may store the same in the memory 220. Accordingly, each of the plurality of high-dimensional input vectors may include the plurality of pieces of sensor information at each corresponding point in time. Hereinafter, the plurality of high-dimensional input vectors may indicate the high-dimensional input vector 221 generated by the encoder 231 and stored in the memory 220.

The imitation learning unit 232 may train the HDC object model 222 using imitation learning. The imitation learning unit 232 may use the learning data set 223 to train the HDC object model 222. The learning data set 223 may include the plurality of pieces of sensor information of the sensor unit 110 labeled with a control action signal indicated by a robot drive signal received from a user in response to each point in time. The robot drive signal received from the user may be received from the user terminal 10. The robot drive signal may be an action signal that controls the action of the robot 10 in response to each point in time.

The imitation learning unit 232 may collect learning data for the plurality of points in time from the user terminal 30 or an external device and store the same in the learning data set 223. The learning data may include the plurality of pieces of sensor information of the sensor unit 110. In collecting the learning data, the imitation learning unit 232 may collect a control action signal together indicated by a robot drive signal received from a user and match the collected control action signal with the sensor information at each corresponding point in time. Accordingly, each of the plurality of sensor information included in the learning data set 223 may correspond to the control action signal indicated by the robot drive signal received from each user. For example, the learning data set 223 may include sensor information of a first point in time and a control action signal labeled to the sensor information of the first point in time, and the control action signal labeled to the sensor information may include the robot drive signal received from the user.

The imitation learning unit 232 may train a method for generating a high-dimensional vector that matches the sensor information with each of a plurality of robot actions for the HDC object model 222. The plurality of robot actions may indicate an action of each of the plurality of actuators of the actuator unit 120. The action of each of the plurality of actuators may include, for example, a rotation direction of a motor, an angle, and a torque.

The similarity analyzer 233 may analyze a similarity between or among two or more high-dimensional vectors and generate a result of analyzing the similarity. When training of the HDC object model 222 is completed, the HDC object model 222 may generate a plurality of high-dimensional object vectors corresponding to a plurality of robot actions. The similarity analyzer 233 may analyze a similarity between the plurality of high-dimensional input vectors and the plurality of high-dimensional object vectors generated from the trained HDC object model 222.

The HDC object model 222 may match a robot action corresponding to each of the plurality of high-dimensional input vectors among the plurality of robot actions based on a result of analyzing the similarity of the similarity analyzer 233 and generate a plurality of high-dimensional action vectors. The HDC object model 222 may transmit a robot drive signal indicating a robot action of the corresponding high-dimensional action vector among the generated plurality of high-dimensional action vectors to the robot 10. The actuator unit 120 may be operated based on the received robot drive signal.

Hereinafter, an action by the imitation learning unit 232 of training the HDC object model 222 to imitate based on the learning data set 223 will be described.

The learning data set 223 may include hard negative samples corresponding to a label specified as hard negative among control action signals labeled to each of the plurality of pieces of sensor information and the plurality of pieces of sensor information, and positive samples corresponding to a label specified as positive. The samples included in the learning data set 223 may include the hard negative samples and the positive samples.

When the imitation learning unit 232 trains the HDC object model 222, the entire hard negative samples and positive samples included in the learning data set 223 may be loaded and used. The imitation learning unit 232 uses the hard negative samples and performs imitation learning, which is called a hard negative mining technique.

The imitation learning action for the HDC object model 222 may include a plurality of learning iterations. The imitation learning unit 232 may determine a weighting indicating samples to be utilized in training among the hard negative samples based on a hyper parameter for each of the plurality of learning iterations. The imitation learning unit 232 may utilize some different samples among the hard negative samples for each of the plurality of learning iterations. For example, the imitation learning unit 232 may train the HDC object model 222 based on the entire positive samples and at least one first sample among the hard negative samples in first learning iteration among the plurality of learning iterations. In addition, the imitation learning unit 232 may train the HDC object model based on the entire positive samples and at least one second sample that is different from the at least one first sample among the hard negative samples in second learning iteration next to the first learning iteration among the plurality of learning iterations.

When the imitation training for the HDC object model 222 is completed, the plurality of high-dimensional object vectors may be generated from the HDC object model 222. Hereinafter, the plurality of high-dimensional object vectors may indicate the high-dimensional vector generated by the HDC object model 222 on which the imitation learning is completed. Each of the plurality of high-dimensional object vectors may represent each of the plurality of robot actions. After the learning is completed, the HDC object model 222 may receive a result of analyzing the similarity between the plurality of high-dimensional input vectors and the generated plurality of high-dimensional object vectors from the similarity analyzer 233 in order to infer a robot action signal corresponding to the plurality of high-dimensional input vectors. The HDC object model 222 may generate the plurality of high-dimensional action vectors including the inferred robot action signal corresponding to each of the plurality of high-dimensional input vectors based on a result of analyzing the similarity. Hereinafter, the plurality of high-dimensional action vectors may be high-dimensional vectors matched after the HDC object model 222 infers a robot action signal corresponding to each of the plurality of high-dimensional input vectors based on a result of analyzing the similarity.

The similarity analyzer 233 may determine a similarity corresponding to each of the plurality of high-dimensional input vectors by performing a matrix multiplication of each of the plurality of high-dimensional input vectors with a vector corresponding to the plurality of high-dimensional object vectors. The result of analyzing the similarity generated by the similarity analyzer 233 may include a similarity corresponding to each of the plurality of high-dimensional input vectors.

For each high-dimensional input vector, the HDC object model 222 may determine a result of inferring a robot action indicating the highest value among similarity values for each of the plurality of robot actions. The plurality of high-dimensional action vectors generated by the HDC object model 222 may include an inference result determined based on a result of analyzing the similarity in a vector corresponding to the plurality of high-dimensional input vectors.

Figure 3:
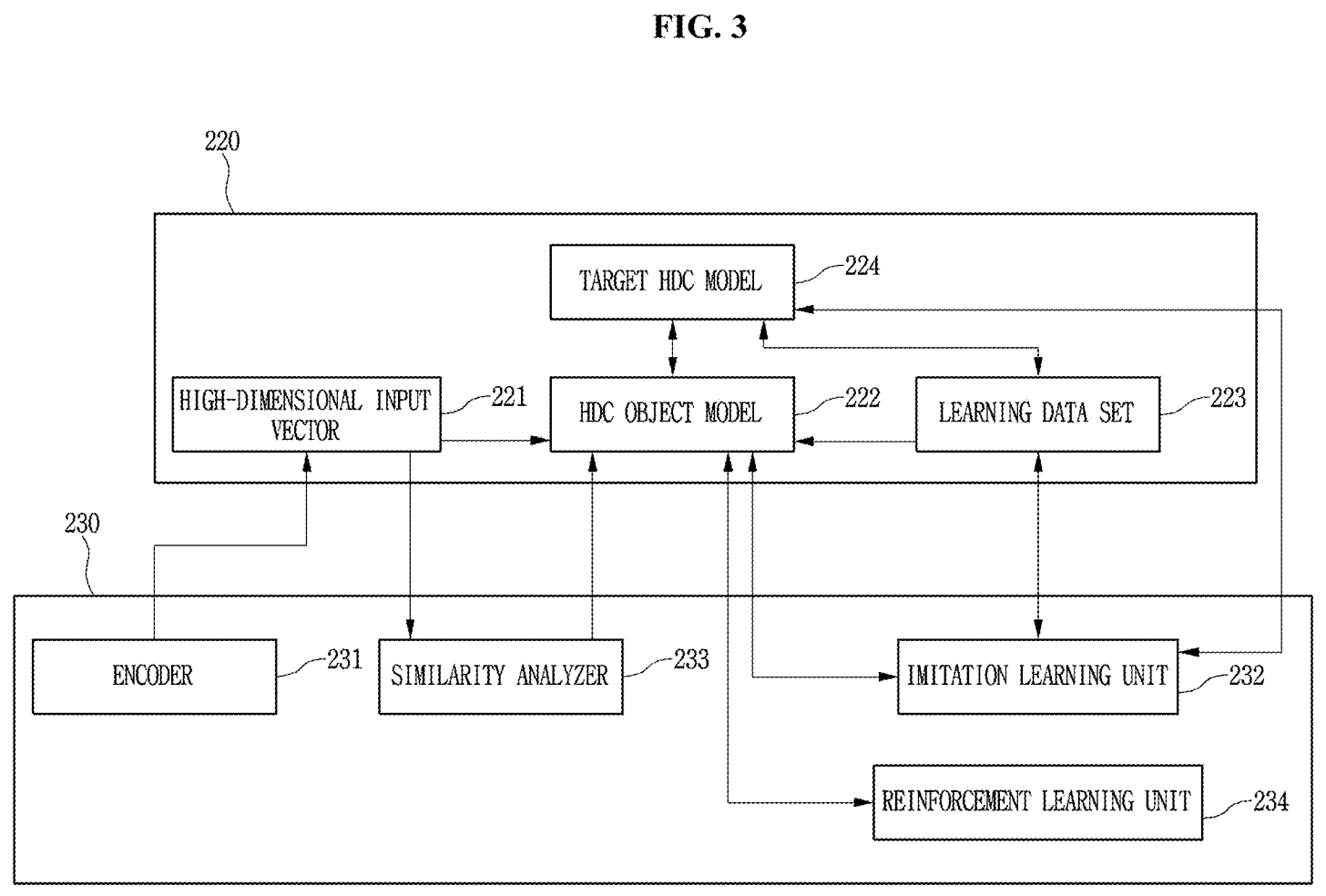

FIG. 3 is a diagram illustrating a detailed configuration of a memory and a processor illustrated in FIG. 1 according to another embodiment that is different from an embodiment illustrated in FIG. 2.

Referring to FIG. 3, the memory 220 may include the high-dimensional input vector 221, the HDC object model 222, the learning data set 223 illustrated in FIG. 2, and a target HDC model 224. In addition, the processor 230 may include the encoder 231, the imitation learning unit 232, the similarity analyzer 233, and a reinforcement learning unit 234.

Hereinafter, the descriptions overlapping with those of the high-dimensional input vector 221, the HDC object model 222, the learning data set 223, the encoder 231, the imitation learning unit 232, and the similarity analyzer 233 will be omitted.

As illustrated in FIG. 3, the robot drive system 1 may stabilize learning for the HDC object model 222 through reinforcement learning. Hereinafter, an action of stabilizing the learning of the HDC object model 222 through the target HDC model 224 and the reinforcement learning unit 224 will be referred to as a "reinforcement learning action."

The reinforcement learning unit 224 may reinforcement-train the HDC object model 222. In an embodiment, reinforcement learning may be learning targeting so that when behavior is taken in response to state data such as LiDAR sensing data, the corresponding behavior may be behavior with the greatest reward.

The reward in the reinforcement learning may indicate a similarity in an embodiment. An action with the highest similarity value between the plurality of high-dimensional input vectors and the plurality of high-dimensional object vectors generated by the HDC object model 222 may be an inference result.

The similarity analyzer 233 may analyze a first similarity between a first high-dimensional input vector corresponding to a first point in time among the plurality of high-dimensional input vectors and a first high-dimensional object vector corresponding to the first point in time among the plurality of high-dimensional object vectors, and the HDC object model 222 may infer a first control action corresponding to the first point in time based on a result of analyzing the first similarity.

In addition, the target HDC model 224 may analyze a second similarity between a second high-dimensional input vector corresponding to a second point in time among the plurality of high-dimensional input vectors and a second high-dimensional object vector corresponding to the second point in time based on a result of executing the first control action. Herein, the second point in time may be a point in time immediately after the first point in time among the plurality of points in time. The reinforcement learning unit 224 may update the HDC object model 222 based on the second similarity analyzed by the target HDC model 224.

Hereinafter, for convenience of explanation, the sensor information corresponding to each point in time among the plurality of pieces of sensor data will be referred to as "state data," and the robot action corresponding to the state data among the plurality of robot actions will be referred to as "behavior."

When the HDC object model 222 executes behavior A(t) inferred for state data E(t) at a t point in time, the state data may be changed to state data E(t+1) at a t+1 point in time according to behavior A(t). The reinforcement learning unit 224 may update the HDC object model 222 by comparing a reward expected to be obtained from an inference of behavior A(t) inferred by the HDC object model 222, in other words, a reward that may be actually obtained at a t+1 point in time with a similarity (Q1) at a t point in time, in other words, a similarity (Q2) at a t+1 point in time. In this process, the target HDC model 224 may calculate a reward that may be actually obtained at a t+1 point in time.

The HDC object model 222 may be updated for every learning data, whereas the target HDC model 224 may be updated for each predetermined period.

FIG. 4 is a flowchart illustrating a robot drive method according to an embodiment of the present disclosure.

Hereinafter, the descriptions overlapping with those of each configuration of the robot drive server 20 will be omitted.

Referring to FIG. 4, the processor 230 may generate the plurality of high-dimensional input vectors by encoding the plurality of pieces of time-series sensor data (S110).

The processor 230 may train the HDC object model using the learning data set 223 (S120). The processor 230 may train a method for generating a high-dimensional vector that matches the sensor information with each of a plurality of robot actions for the HDC object model 222.

The processor 230 may analyze a similarity between the plurality of high-dimensional input vectors and the plurality of high-dimensional object vectors generated from the trained HDC object model 222 (S130). The processor 230 may analyze a similarity by performing a matrix multiplication of vectors at a point in time corresponding to each of the plurality of high-dimensional input vectors and the plurality of high-dimensional object vectors.

The processor 230 may generate a plurality of high-dimensional action vectors by matching a robot action corresponding to each of the plurality of high-dimensional input vectors among the plurality of robot actions based on a result of analyzing the similarity (S140). With respect to each of the plurality of high-dimensional input vectors, the HDC object model 222 may determine a high-dimensional vector with the highest similarity as an inference result.

FIG. 5 is a flowchart illustrating a reinforcement learning action of a robot drive method according to an embodiment of the present disclosure.

Hereinafter, the descriptions overlapping with those of each configuration of the robot drive server 20 will be omitted.

Referring to FIG. 5, the processor 230 may generate the plurality of high-dimensional input vectors by encoding the plurality of pieces of time-series sensor data (S210).

The processor 230 may train the HDC object model using the learning data set 223 (S220). The processor 230 may train a method for generating a high-dimensional vector that matches the sensor information with each of a plurality of robot actions for the HDC object model 222.

The processor 230 may analyze a first similarity between a high-dimensional input vector at a first point in time and a high-dimensional object vector at a first point in time anticipated based on the trained HDC object model 222 (S230).

The processor 230 may infer a first control action corresponding to the first point in time according to the first similarity (S240).

The processor 230 may analyze a second similarity between a second high-dimensional input vector corresponding to a second point in time among the plurality of high-dimensional input vectors and a second high-dimensional object vector corresponding to the second point in time immediately after the first point in time among the plurality of high-dimensional object vectors (S250).

The processor 230 may update the HDC object model 222 according to the second similarity (S260).

The aforementioned embodiments may be implemented as a hardware element, a software element and/or a combination of a hardware element and a software element. For example, the device, method, and element described in the embodiments may be implemented using one or more general-purpose computers or special-purpose computers, for example, a processor, a controller, an arithmetic logic unit (ALU), a digital signal processor, a microcomputer, a field programmable array (FPA), a programmable logic unit (PLU), a microprocessor or any other device capable of executing or responding to an instruction. The processing device may perform an operating system (OS) and one or more software applications executed on the OS. Furthermore, the processing device may access, store, manipulate, process and generate data in response to the execution of software. For convenience of understanding, one processing device has been described as being used, but a person having ordinary skill in the art may understand that the processing device may include a plurality of processing elements and/or a plurality of types of processing elements. For example, the processing device may include a plurality of processors or a single processor and a single controller. Furthermore, other processing configurations, such as a parallel processor, are also possible.

The method according to embodiments may be implemented in the form of a program instruction executable by various computer means and stored in a computer-readable recording medium. The computer-readable recording medium may include a program instruction, a data file, and a data structure solely or in combination. The program instruction recorded on the recording medium may have been specially designed and configured for the embodiment or may be known to those skilled in computer software. The computer-readable recording medium includes a hardware device specially configured to store and execute the program instruction, for example, magnetic media such as a hard disk, a floppy disk, and a magnetic tape, optical media such as a CD-ROM or a DVD, magneto-optical media such as a floptical disk, a ROM, a RAM, or a flash memory. Examples of the program instruction may include both a machine-language code, such as a code written by a compiler, and a high-level language code executable by a computer using an interpreter. The hardware device may be configured in the form of one or more software modules for executing the operation of the embodiment, and the vice versa. Software may include a computer program, code, an instruction or a combination of one or more of them and may configure the processor so that it operates as desired or may instruct the processor independently or collectively. The software and/or data may be permanently or temporarily embodied in any type of machine, component, physical device, virtual equipment or computer storage medium or device or a transmitted signal wave in order to be interpreted by the processor or to provide an instruction or data to the processor. The software may be distributed to computer systems connected over a network and may be stored or executed in a distributed manner. The software and the data may be stored in one or more computer-readable recording media.

Although the embodiments of the present disclosure have been described above, the present disclosure is not limited to the above embodiments, and may be implemented to be variously modified within the scope of the detailed description and accompanying drawings as long as it does not deviate from the spirit of the present disclosure and does not impair the effect. In addition, it is natural that such embodiments fall within the scope of the present disclosure.

Detailed Description of Main Elements

1: robot drive system 10: robot 110: sensor unit 120: actuator unit 20: robot drive server 210: transceiver 220: memory 221: high-dimensional input vector 222: HDC object model 223: learning data set 224: target HDC model 230: processor 231: encoder 232: imitation learning unit 233: similarity analyzer 234: reinforcement learning unit 30: user terminal

What is claimed is:

1. A robot drive system comprising:
   an encoder for encoding a plurality of pieces of time-series sensor data measured from a plurality of sensors provided in a robot to generate a plurality of high-dimensional input vectors;
   an imitation learning unit for training a high-dimensional computing (HDC) object model to generate a high-dimensional vector matched with each of a plurality of robot actions and sensor information using a learning data set comprising a plurality of pieces of sensor information of the plurality of sensors labeled with a control action signal indicated by a robot drive signal received from a user in response to each point in time; and
   a similarity analyzer for analyzing a similarity between a plurality of high-dimensional object vectors generated from the HDC object model and the plurality of high-dimensional input vectors when training of the HDC object model is completed,
   wherein the HDC object model matches a robot action corresponding to each of the plurality of high-dimensional input vectors among the plurality of robot actions based on a result of analyzing the similarity and generates a plurality of high-dimensional action vectors.

2. The system of claim 1, wherein the learning data set comprises hard negative samples corresponding to a label specified as hard negative among control action signals labeled to each of the plurality of pieces of sensor information and the plurality of pieces of sensor information, and positive samples corresponding to a label specified as positive.

3. The system of claim 2, wherein the imitation learning unit:

determines a weighting indicating samples to be utilized in training among the hard negative samples based on a hyper parameter for each of a plurality of learning iterations;

trains the HDC object model based on the entire positive samples and at least one first sample among the hard negative samples in first learning iteration among the plurality of learning iterations; and trains the HDC object model based on the entire positive samples and at least one second sample that is different from the at least one first sample among the hard negative samples in second learning iteration next to the first learning iteration among the plurality of learning iterations.

4. The system of claim 1, wherein the similarity analyzer determines a similarity corresponding to each of the plurality of high-dimensional input vectors by performing a matrix multiplication of each of the plurality of high-dimensional input vectors with a vector corresponding to the plurality of high-dimensional object vectors, wherein a result of analyzing the similarity comprises the similarity corresponding to each of the plurality of high-dimensional input vectors.

5. The system of claim 1, wherein:

each of the plurality of pieces of time-series sensor data comprises sensor information corresponding to each of a plurality of points in time; and the encoder generates the plurality of high-dimensional input vectors indicating the sensor information corresponding to each of the plurality of points in time from the plurality of pieces of time-series sensor data.

6. The system of claim 5, wherein:

the similarity analyzer analyzes a first similarity between a first high-dimensional input vector corresponding to a first point in time among the plurality of high-dimensional input vectors and a first high-dimensional object vector corresponding to the first point in time among the plurality of high-dimensional object vectors;

the HDC object model infers a first control action corresponding to the first point in time based on a result of analyzing the first similarity; and the plurality of points in time comprises the first point in time.

7. The system of claim 6, further comprising:

a target HDC model for analyzing a second similarity between a second high-dimensional input vector corresponding to a second point in time among the plurality of high-dimensional input vectors and a second high-dimensional object vector corresponding to the second point in time among the plurality of high-dimensional object vectors based on a result of executing the first control action; and a reinforcement learning unit for updating the HDC object model based on the second similarity, wherein the second point in time is a point in time immediately after the first point in time among the plurality of points in time.

8. A robot drive method comprising:

encoding a plurality of pieces of time-series sensor data measured from a plurality of sensors provided in a robot to generate a plurality of high-dimensional input vectors;

training a high-dimensional computing (HDC) object model to generate a high-dimensional vector matched with each of a plurality of robot actions and sensor information using a learning data set comprising a plurality of pieces of sensor information of the plurality of sensors labeled with a control action signal indicated by a robot drive signal received from a user in response to each point in time;

analyzing a similarity between a plurality of high-dimensional object vectors generated from the HDC object model and the plurality of high-dimensional input vectors when training of the HDC object model is completed; and generating a plurality of high-dimensional action vectors by matching a robot action corresponding to each of the plurality of high-dimensional input vectors among the plurality of robot actions based on a result of analyzing the similarity.

9. The method of claim 8, wherein:

the learning data set comprises hard negative samples corresponding to a label specified as hard negative among control action signals labeled to each of the plurality of pieces of sensor information and the plurality of pieces of sensor information, and positive samples corresponding to a label specified as positive; and the method further comprises:

determining a weighting indicating samples to be utilized in training among the hard negative samples based on a hyper parameter for each of a plurality of learning iterations;

training the HDC object model based on the entire positive samples and at least one first sample among the hard negative samples in first learning iteration among the plurality of learning iterations; and training the HDC object model based on the entire positive samples and at least one second sample that is different from the at least one first sample among the hard negative samples in second learning iteration next to the first learning iteration among the plurality of learning iterations.

10. The method of claim 8, further comprising: determining a similarity corresponding to each of the plurality of high-dimensional input vectors by performing a matrix multiplication of each of the plurality of high-dimensional input vectors with a vector corresponding to the plurality of high-dimensional object vectors, wherein a result of analyzing the similarity comprises a similarity corresponding to each of the plurality of high-dimensional input vectors.

11. The method of claim 8, further comprising generating the plurality of high-dimensional input vectors indicating sensor information corresponding to each of the plurality of points in time from the plurality of pieces of time-series sensor data.

12. The method of claim 11, further comprising:

analyzing a first similarity between a first high-dimensional input vector corresponding to a first point in time among the plurality of high-dimensional input vectors and a first high-dimensional object vector corresponding to the first point in time among the plurality of high-dimensional object vectors; and inferring a first control action corresponding to the first point in time based on a result of analyzing the first similarity, wherein the plurality of points in time comprises the first point in time.

13. The method of claim 12, further comprising:

analyzing a second similarity between a second high-dimensional input vector corresponding to a second point in time among the plurality of high-dimensional input vectors and a second high-dimensional object vector corresponding to the second point in time among the plurality of high-dimensional object vectors based on a result of executing the first control action; and updating the HDC object model based on the second similarity, wherein the second point in time is a point in time immediately after the first point in time among the plurality of points in time.

* * * * *